(12) United States Patent
Chang

(10) Patent No.: US 10,967,544 B2
(45) Date of Patent: Apr. 6, 2021

(54) MOLD SEPARATION DEVICE AND SEPARATION METHOD THEREOF

(71) Applicant: HIMAX TECHNOLOGIES LIMITED, Tainan (TW)

(72) Inventor: Jui-Tang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 477 days.

(21) Appl. No.: 15/828,451

(22) Filed: Dec. 1, 2017

(65) Prior Publication Data
US 2019/0168423 A1    Jun. 6, 2019

(51) Int. Cl.
| | | |
|---|---|---|
| B29C 33/44 | (2006.01) | |
| B29C 37/00 | (2006.01) | |
| B26F 1/38 | (2006.01) | |
| B26D 7/26 | (2006.01) | |
| B26D 5/10 | (2006.01) | |
| B29C 33/72 | (2006.01) | |
| B29C 33/20 | (2006.01) | |
| B29C 37/02 | (2006.01) | |
| B26D 3/30 | (2006.01) | |
| B26D 3/28 | (2006.01) | |

(Continued)

(52) U.S. Cl.
CPC .............. *B29C 33/444* (2013.01); *B26D 1/04* (2013.01); *B26D 3/282* (2013.01); *B26D 3/30* (2013.01); *B26D 5/10* (2013.01); *B26D 7/2628* (2013.01); *B26F 1/38* (2013.01); *B29C 33/20* (2013.01); *B29C 33/72* (2013.01); *B29C 37/0007* (2013.01); *B29C 37/02* (2013.01); *B26D 2001/006* (2013.01); *B26F 2001/388* (2013.01); *B29C 2793/0027* (2013.01)

(58) Field of Classification Search
CPC ....... B29C 33/444; B29C 33/20; B29C 33/72; B29C 37/0007; B29C 37/02; B29C 2793/0027; B26D 1/04; B26D 3/282; B26D 3/30; B26D 5/10; B26D 7/2628; B26D 2001/006; B26F 1/38; B26F 2001/388

See application file for complete search history.

(56) References Cited

U.S. PATENT DOCUMENTS 5,709,827 A * 1/1998 Andersen .............. B01F 3/1214
264/102
5,935,492 A * 8/1999 Martin .................... B29C 33/20
264/1.37

(Continued)

FOREIGN PATENT DOCUMENTS

CN         102332416 A  *  1/2012

*Primary Examiner* — Matthew J Daniels
*Assistant Examiner* — Andrew L Swanson
(74) *Attorney, Agent, or Firm* — JCIPRNET

(57) ABSTRACT

A mold separation device includes a carrying mechanism, a scraping mechanism, and two separation mechanisms. The carrying mechanism is adapted to carry a first mold and a second mold bonded to the first mold. The scraping mechanism is disposed at an edge of the carrying mechanism and is adapted to scrape off a spilled glue produced when the first mold is bonded to the second mold. The separation mechanisms are disposed at the edge of the carrying mechanism and are located on two opposite sides of the scraping mechanism. The separation mechanisms are adapted to pull open the first mold and the second mold so that the first mold and the second mold are separated from each other.

9 Claims, 6 Drawing Sheets

(51) Int. Cl.
 *B26D 1/04* (2006.01)
 *B26D 1/00* (2006.01)

(56) References Cited

U.S. PATENT DOCUMENTS

| | | | |
|---|---|---|---|
| 7,670,452 B2 * | 3/2010 | Heidari | B08B 9/035 156/707 |
| 2002/0167117 A1 * | 11/2002 | Chou | B29C 43/021 264/338 |
| 2007/0092594 A1 * | 4/2007 | Ho | B29C 43/003 425/444 |

* cited by examiner

MOLD SEPARATION DEVICE AND SEPARATION METHOD THEREOF

BACKGROUND OF THE INVENTION

Field of the Invention

The disclosure relates to a separation device and a separation method thereof, and in particular, to a mold separation device and a separation method thereof for separating two molds.

Description of Related Art

Currently, after a master mold is pressed onto a sub-mold, the master mold and the sub-mold have to be manually separated with a blade tool. Namely, a manual separation process is performed. However, since it is required to insert the blade tool between the master mold and the sub-mold, in addition to potentially damaging the master mold and the sub-mold, a recess is likely to be left at a portion of the sub-mold where the blade tool is inserted. Accordingly, when glue is coated in a subsequent process, the glue provided at a fixed amount is filled in the recess of the sub-mold, which results in issues of insufficient glue and uneven glue coating.

SUMMARY OF THE INVENTION

An embodiment of the invention provides a mold separation device configured to separate a first mold and a second mold connected to each other.

An embodiment of the invention provides a mold separation method using the foregoing mold separation device, and the mold separation method effectively prevents damage to the first mold and the second mold in the separation process.

A mold separation device according to an embodiment of the invention includes a carrying mechanism, a scraping mechanism, and two separation mechanisms. The carrying mechanism is adapted to carry a first mold and a second mold bonded to the first mold. The scraping mechanism is disposed at an edge of the carrying mechanism and is adapted to scrape off a spilled glue produced when the first mold is bonded to the second mold. The separation mechanisms are disposed at the edge of the carrying mechanism and are located on two opposite sides of the scraping mechanism. The separation mechanisms are adapted to pull open the first mold and the second mold so that the first mold and the second mold are separated from each other.

In an embodiment of the invention, the mold separation device further includes a working platform, and the working platform includes a platform surface, an accommodating recess, and a spin table. A height difference exists between a bottom surface of the accommodating recess and the platform surface, and the spin table is located on the platform surface.

In an embodiment of the invention, the carrying mechanism is assembled on the spin table, and the spin table is spun to cause the scraping mechanism to scrape off the spilled glue produced when the first mold is bonded to the second mold. The scraping mechanism is located in the accommodating recess, and the separation mechanisms are assembled on the platform surface.

In an embodiment of the invention, the mold separation device further includes a blocking plate assembled on the platform surface, located at another edge of the carrying mechanism opposite to the edge, and configured to abut edges of the first mold and the second mold.

In an embodiment of the invention, the mold separation device further includes a vacuum on button and a vacuum off button. The vacuum on button is disposed on the working platform and is located on the platform surface. A vacuum adsorption force between the first mold and the carrying mechanism is generated when the vacuum on button is pressed. The vacuum off button is disposed on the working platform and is located on the platform surface. The vacuum adsorption force between the first mold and the carrying mechanism is removed when the vacuum off button is pressed.

In an embodiment of the invention, the scraping mechanism includes a blade tool and an adjustment base. The adjustment base includes a distance controlling member, an angle controlling member, and a height controlling member. The blade tool is disposed on the adjustment base. A distance between the blade tool and the spilled glue is adjusted by the distance controlling member. A blade angle of the blade tool is adjusted by the angle controlling member. A blade height of the blade tool is adjusted by the height controlling member.

In an embodiment of the invention, each of the separation mechanisms includes a first separation part, a second separation part, and a pull controlling member. The first separation part and the second separation part are disposed on the pull controlling member. The second separation part is adapted to be moved relatively to the first separation part by a vertical distance through the pull controlling member.

In an embodiment of the invention, the first separation part of each of the separation mechanisms abuts an upper surface of the first mold, and the second separation part abuts a lower surface of the second mold. When the second separation part is constantly moved relatively to the first separation part by the vertical distance, the first mold and the second mold are pulled open so that the first mold and the second mold are separated from each other.

In an embodiment of the invention, a thickness of the first mold is smaller than a thickness of the second mold.

In an embodiment of the invention, the second mold includes an indented portion indented towards the first mold to define an indented space with the first mold. The spilled glue produced when the first mold is bonded to the second mold is located in the indented space.

A mold separation method according to an embodiment of the invention includes the following steps: providing a mold separation device including a carrying mechanism, a scraping mechanism, and two separation mechanisms, wherein the scraping mechanism is disposed at an edge of the carrying mechanism, and the separation mechanisms are disposed at the edge of the carrying mechanism and are located on two opposite sides of the scraping mechanism; placing a first mold and a second mold bonded to the first mold on the carrying mechanism; causing the scraping mechanism to scrape off a spilled glue produced when the first mold is bonded to the second mold; and after scraping off the spilled glue, causing the separation mechanisms to pull open the first mold and the second mold so that the first mold and the second mold are separated from each other.

In an embodiment of the invention, the mold separation device further includes a working platform, and the working platform includes a platform surface, an accommodating recess, and a spin table. A height difference exists between a bottom surface of the accommodating recess and the platform surface, and the spin table is located on the platform surface.

In an embodiment of the invention, the carrying mechanism is assembled on the spin table, the scraping mechanism is located in the accommodating recess, and the separation mechanisms are assembled on the platform surface. The step of causing the scraping mechanism to scrape off the spilled glue produced when the first mold is bonded to the second mold includes: moving the scraping mechanism close to the spilled glue produced when the first mold is bonded to the second mold; and spinning the spin table to spin the carrying mechanism, the first mold, and the second mold through the spin table and cause the scraping mechanism to scrape off the spilled glue produced when the first mold is bonded to the second mold.

In an embodiment of the invention, the mold separation device further includes a blocking plate. After placing the first mold and the second mold bonded to the first mold on the carrying mechanism and before causing the scraping mechanism to scrape off the spilled glue produced when the first mold is bonded to the second mold, the mold separation method further includes: assembling the blocking plate on the platform surface, wherein the blocking plate is located at another edge of the carrying mechanism opposite to the edge and is configured to abut edges of the first mold and the second mold.

In an embodiment of the invention, the mold separation device further includes a vacuum on button and a vacuum off button. The vacuum on button and the vacuum off button are disposed on the working platform and are located on the platform surface. The mold separation method further includes: pressing the vacuum on button to generate a vacuum adsorption force between the first mold and the carrying mechanism, after placing the first mold and the second mold bonded to the first mold on the carrying mechanism and before assembling the blocking plate on the platform surface; and pressing the vacuum off button to remove the vacuum adsorption force between the first mold and the carrying mechanism, after causing the separation mechanisms to pull open the first mold and the second mold.

In an embodiment of the invention, the scraping mechanism includes a blade tool and an adjustment base. The adjustment base includes a distance controlling member, an angle controlling member, and a height controlling member. The blade tool is disposed on the adjustment base. A distance between the blade tool and the spilled glue is adjusted by the distance controlling member. A blade angle of the blade tool is adjusted by the angle controlling member. A blade height of the blade tool is adjusted by the height controlling member.

In an embodiment of the invention, each of the separation mechanisms includes a first separation part, a second separation part, and a pull controlling member. The first separation part and the second separation part are disposed on the pull controlling member. The second separation part is adapted to be moved relatively to the first separation part by a vertical distance through the pull controlling member.

In an embodiment of the invention, the step of causing the separation mechanisms to pull open the first mold and the second mold includes: moving the separation mechanisms close to the carrying mechanism; causing the first separation part of each of the separation mechanisms to abut an upper surface of the first mold; adjusting each of the pull controlling members to move each of the second separation parts relatively to the first separation parts by a vertical distance to abut a lower surface of the second mold; and constantly adjusting each of the pull controlling members to constantly vertically move each of the second separation parts relatively to the first separation parts and pull open the first mold and the second mold so that the first mold and the second mold are separated from each other.

In an embodiment of the invention, a thickness of the first mold is smaller than a thickness of the second mold.

In an embodiment of the invention, the second mold includes an indented portion indented towards the first mold to define an indented space with the first mold. The spilled glue produced when the first mold is bonded to the second mold is located in the indented space.

Accordingly, the mold separation device of the embodiments of the invention includes the scraping mechanism and the separation mechanisms. The scraping mechanism first scrapes off the spilled glue produced when the first mold is bonded to the second mold, and then the separation mechanisms pull open the first mold and the second mold so that the first mold and the second mold are separated from each other. Separating the first mold and the second mold through the mold separation device of the embodiments of the invention prevents damage to the master mold and the sub-mold and the issue of uneven glue in a subsequent glue coating process resulting from inserting the blade tool between the master mold and the sub-mold as conventionally required.

To provide a further understanding of the aforementioned and other features and advantages of the disclosure, exemplary embodiments, together with the reference drawings, are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
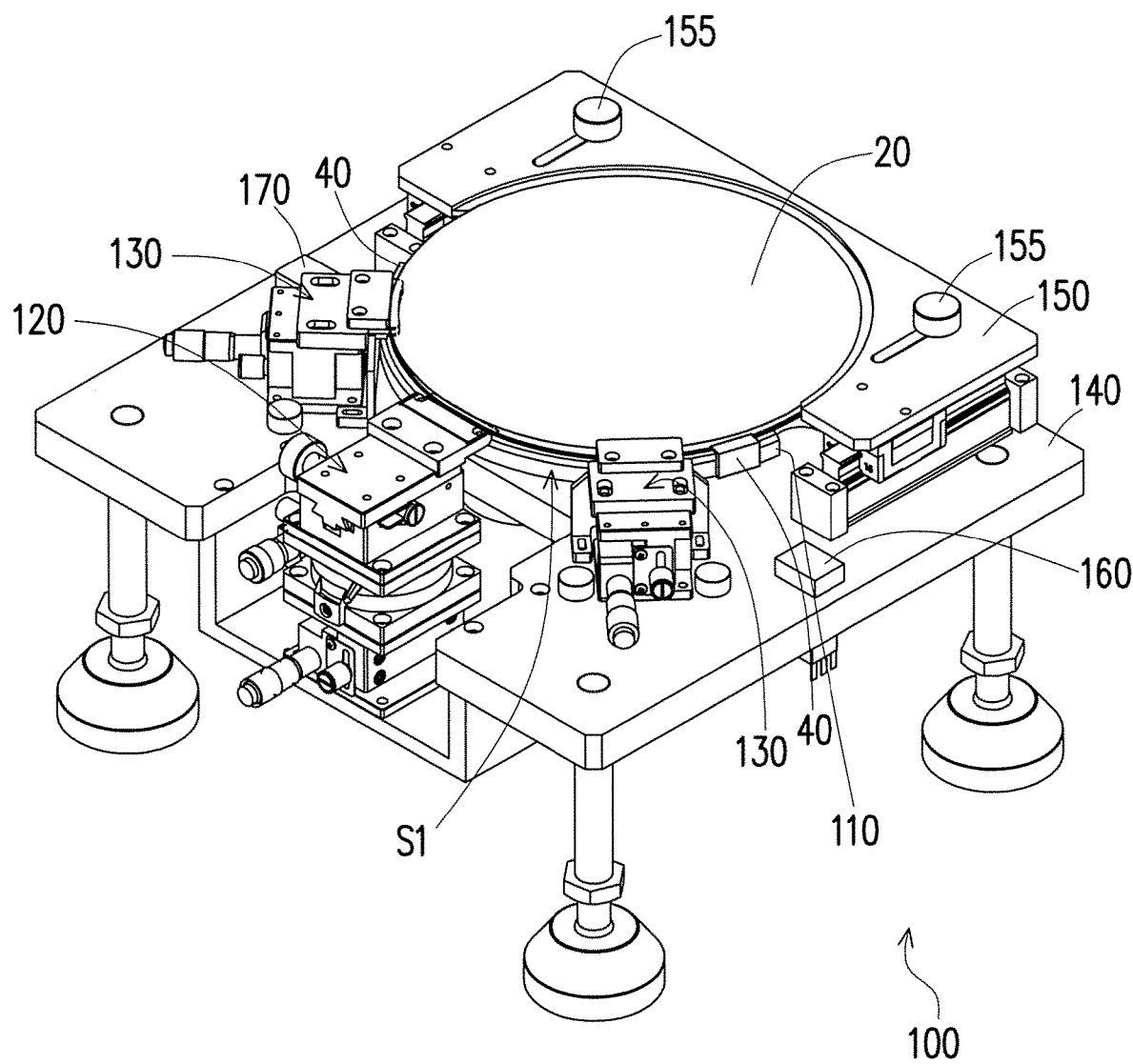
FIG. 1A is a schematic diagram illustrating a perspective view of a mold separation device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
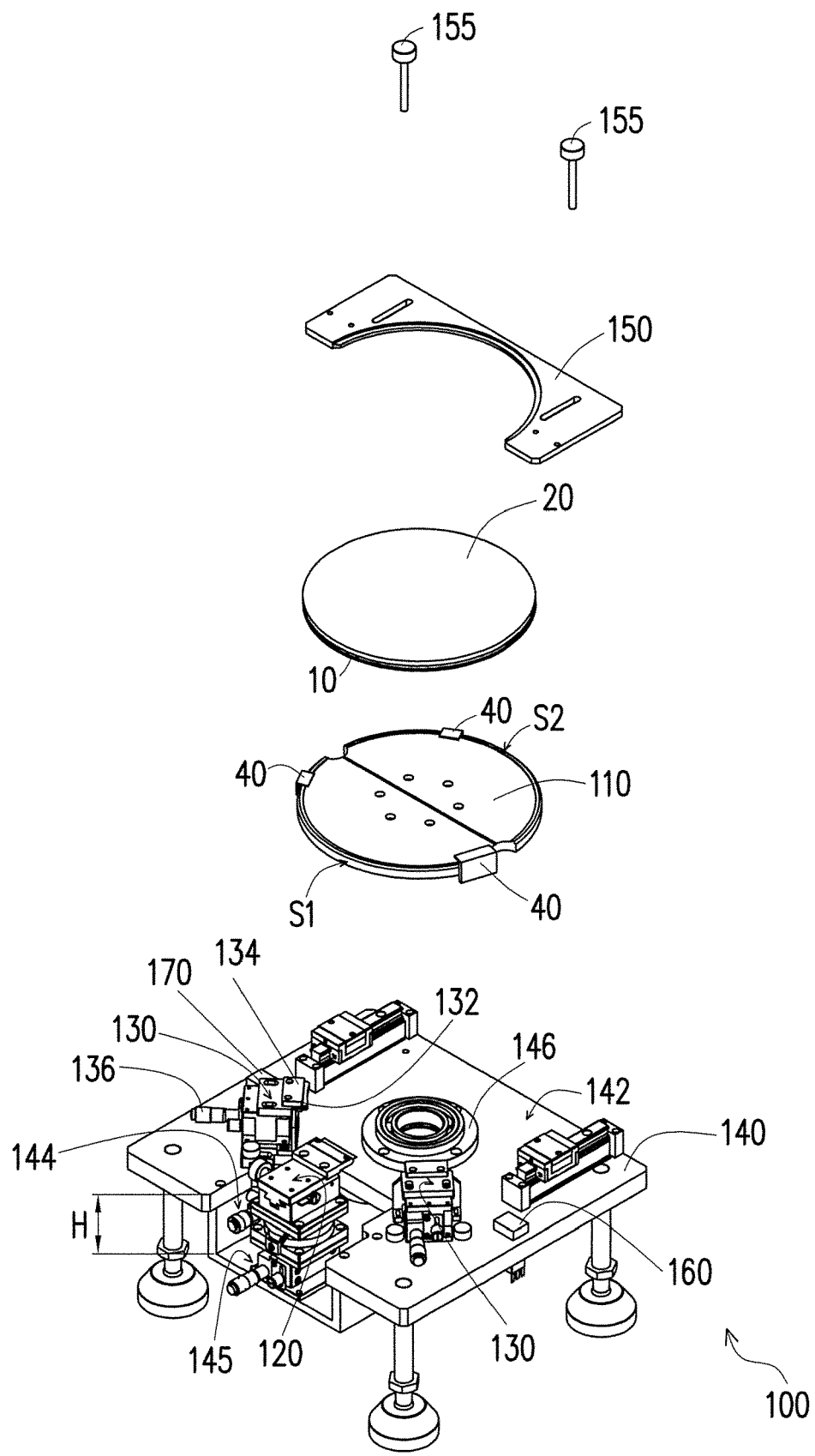
FIG. 1B is a partial perspective exploded view illustrating the mold separation device of FIG. 1A.
Figure 1C:
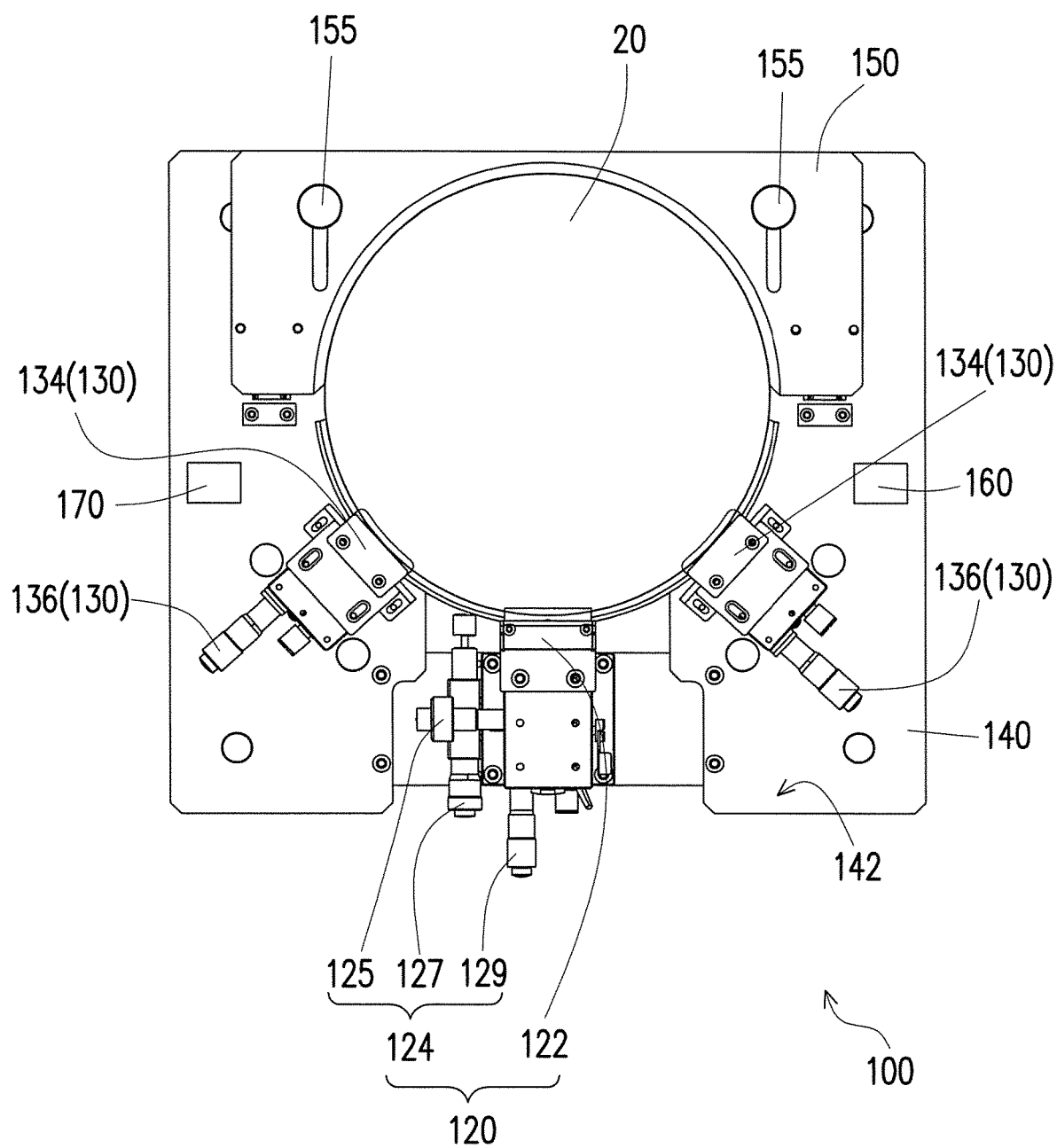
FIG. 1C is a schematic diagram illustrating a top view of the mold separation device of FIG. 1A.
Figure 2:
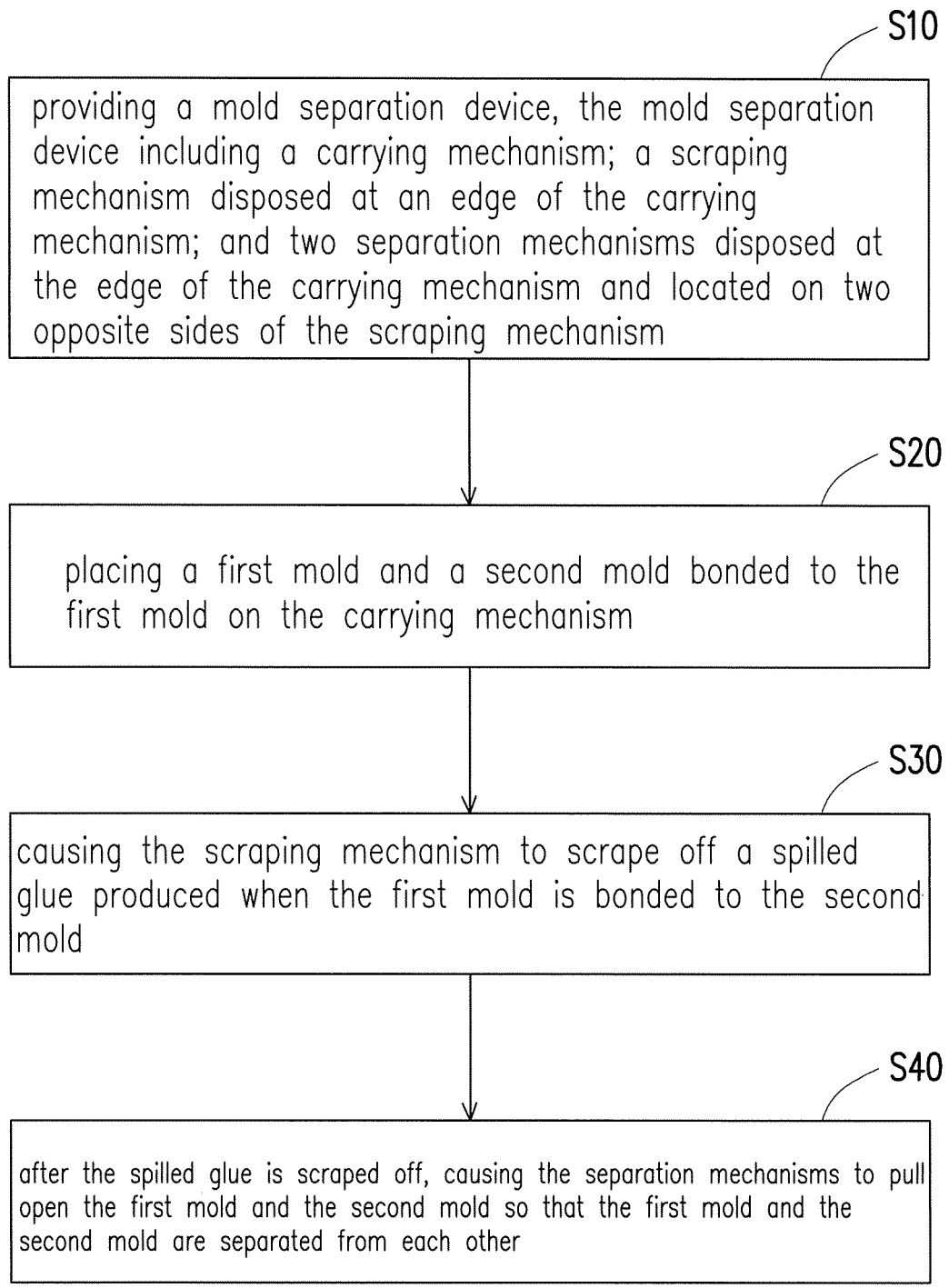
FIG. 2 is a flowchart illustrating a mold separation method according to an embodiment of the invention.

FIG. 1A is a schematic diagram illustrating a perspective view of a mold separation device according to an embodiment of the invention. FIG. 1B is a partial perspective exploded view illustrating the mold separation device of FIG. 1A. FIG. 1C is a schematic diagram illustrating a top view of the mold separation device of FIG. 1A. FIG. 2 is a flowchart illustrating a mold separation method according to an embodiment of the invention. FIG. 3A to FIG. 3E are cross-sectional schematic diagrams illustrating part of steps of the mold separation method of FIG. 2.

Referring to FIG. 1A, FIG. 1B, and FIG. 1C at the same time, in the present embodiment, a mold separation device 100 includes a carrying mechanism 110 (such as a carrying stage), a scraping mechanism 120, and two separation mechanisms 130. The carrying mechanism 110 is adapted to carry a first mold 10 and a second mold 20 bonded to the first mold 10. The scraping mechanism 120 is disposed at an edge S1 of the carrying mechanism 110 and is adapted to scrape off a spilled glue 30 produced when the first mold 10 is bonded to the second mold 20 (refer to FIG. 3A and FIG. 3B). The separation mechanisms 130 are disposed at the edge S1 of the carrying mechanism 110 and are located on two opposite sides of the scraping mechanism 120. The separation mechanisms 130 are adapted to pull open the first mold 10 and the second mold 20 so that the first mold 10 and the second mold 20 are separated from each other (refer to FIG. 3C, FIG. 3D, and FIG. 3E).

Figure 3A:
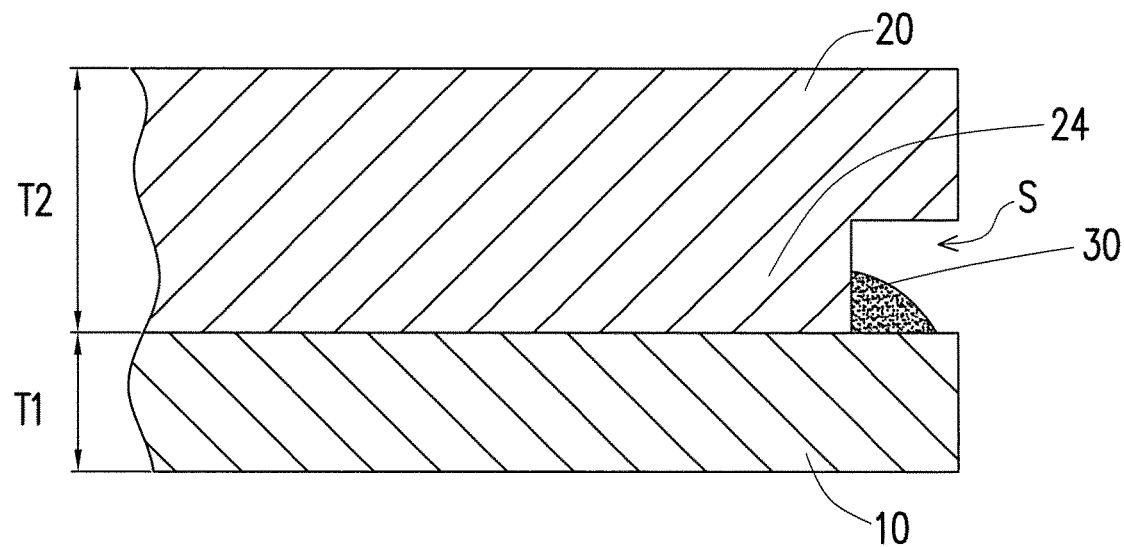
FIG. 3A to FIG. 3E are cross-sectional schematic diagrams illustrating part of steps of the mold separation method of FIG. 2.

In detail, the mold separation device 100 of the present embodiment is adapted to separate the first mold 10 and the second mold 20, wherein a material of the first mold 10 is, for example, nickel, and the first mold 10 may be regarded as a master mold, and a material of the second mold 20 is, for example, quartz, and the second mold 20 may be regarded as a sub-mold. As shown in FIG. 3A, a thickness T1 of the first mold 10 in the present embodiment is embodied as smaller than a thickness T2 of the second mold 20, wherein the thickness T1 of the first mold 10 is, for example, 3 mm, and the thickness T2 of the second mold 20 is, for example, 9 mm, but the invention is not limited hereto. Herein, the second mold 20 includes an indented portion 24 indented towards the first mold 10 to define an indented space S with the first mold 10, and the spilled glue 30 produced when the first mold 10 is bonded to the second mold 20 is located in the indented space S.

Referring to FIG. 1A, FIG. 1B, and FIG. 1C again, the mold separation device 100 of the present embodiment further includes a working platform 140, wherein the working platform 140 includes a platform surface 142, an accommodating recess 144, and a spin table 146. A height difference H exists between a bottom surface 145 of the accommodating recess 144 and the platform surface 142, and the spin table 146 is located on the platform surface 142. The carrying mechanism 110 is assembled on the spin table 146, the scraping mechanism 120 is located in the accommodating recess 144, and the separation mechanisms 130 are assembled on the platform surface 142.

As shown in FIG. 1A and FIG. 1B, the carrying mechanism 110 is provided to carry the first mold 10 and the second mold 20 adhered to each other, wherein the carrying mechanism 110 fixes the first mold 10 on itself through buckle members 40. Herein, the carrying mechanism 110 is, for example, a carrying mechanism having a vacuum-pumping function for further positioning the first mold 10 and the second mold 20 thereon on the carrying mechanism 110. Moreover, since the carrying mechanism 110 is assembled on the spin table 146 of the working platform 140, the spin table 146 can be spun to simultaneously spin the carrying mechanism 110 and the first mold 10 and the second mold 20 carried on the carrying mechanism 110. Herein, a method of spinning the spin table 146 involves, for example, manually spinning or spinning the spin table 146 through automatic control of a computer program, both of which fall into the scope to be protected by the invention.

As shown in FIG. 1C, the scraping mechanism 120 of the present embodiment includes a blade tool 122 and an adjustment base 124. The adjustment base 124 includes a distance controlling member 125, an angle controlling member 127, and a height controlling member 129. The blade tool 122 is disposed on the adjustment base 124. A distance between the blade tool 122 and the spilled glue 30 is adjusted by the distance controlling member 125. A blade angle of the blade tool 122 is adjusted by the angle controlling member 127. A blade height of the blade tool 122 is adjusted by the height controlling member 129. In other words, a user may use the distance controlling member 125, the angle controlling member 127, and the height controlling member 129 to adjust cutting depths and angles of the blade tool 122 to prevent damage to the first mold 10 and the second mold 20.

Moreover, referring to FIG. 1B and FIG. 1C, each of the separation mechanisms 130 of the present embodiment includes a first separation part 132, a second separation part 134, and a pull controlling member 136. The first separation part 132 and the second separation part 134 are disposed on the pull controlling member 136, and the second separation part 134 is adapted to be moved relatively to the first separation part 132 by a vertical distance D through the pull controlling member 136 (refer to FIG. 3D). Preferably, the two separation mechanisms 130 are arranged to have an included angle of 70° (calculated based on central axis lines of the separation mechanisms 130) for the most desirable force applying range, but the invention is not limited hereto.

In addition, referring to FIG. 1A, FIG. 1B, and FIG. 1C again, the mold separation device 100 of the present embodiment further includes a blocking plate 150 assembled on the platform surface 142 of the working platform 140. The blocking plate 150 is located at another edge S2 of the carrying mechanism 110 opposite to the edge S1 and is configured to abut edges of the first mold 10 and the second mold 20 to protect the first mold 10 and the second mold 20. Herein, the blocking plate 150 is, for example, fixed on the platform surface 142 through two locking members 155, but the invention is not limited hereto.

Moreover, the mold separation device 100 of the present embodiment further includes a vacuum on button 160 and a vacuum off button 170. The vacuum on button 160 and the vacuum off button 170 are both disposed on the working platform 140 and are located on the platform surface 142, wherein the vacuum on button 160 and the vacuum off button 170 are both electrically connected to the carrying mechanism 110 to thereby provide a vacuum adsorption force or remove the vacuum adsorption force.

Referring to both FIG. 1A and FIG. 2, a mold separation method of an embodiment of the invention includes the following steps. First, in step S10, a mold separation device 100 is provided, wherein the mold separation device 100 includes a carrying mechanism 110, a scraping mechanism 120, and separation mechanisms 130. The scraping mechanism 120 is disposed at an edge S1 of the carrying mechanism 110, and the separation mechanisms 130 are disposed at the edge S1 of the carrying mechanism 110 and are located on two opposite sides of the scraping mechanism 120.

Then, in step S20, a first mold 10 and a second mold 20 bonded to the first mold 10 are placed on the carrying mechanism 110, and the first mold 10 is fixed on the carrying mechanism 110 through buckle members 40. Next, a vacuum on button 160 is pressed to generate a vacuum adsorption force between the first mold 10 and the carrying mechanism 110 to further position the first mold 10 and the second mold 20 on the carrying mechanism 110.

Afterwards, referring to FIG. 1A and FIG. 1C, a blocking plate 150 is assembled on a platform surface 142 of a working platform 140, wherein the blocking plate 150 is located at another edge S2 of the carrying mechanism 110 opposite to the edge S1 and is configured to abut and protect edges of the first mold 10 and the second mold 20. Herein, the blocking plate 150 is, for example, fixed at its position through locking members 155, but the invention is not limited hereto.

Figure 3B:
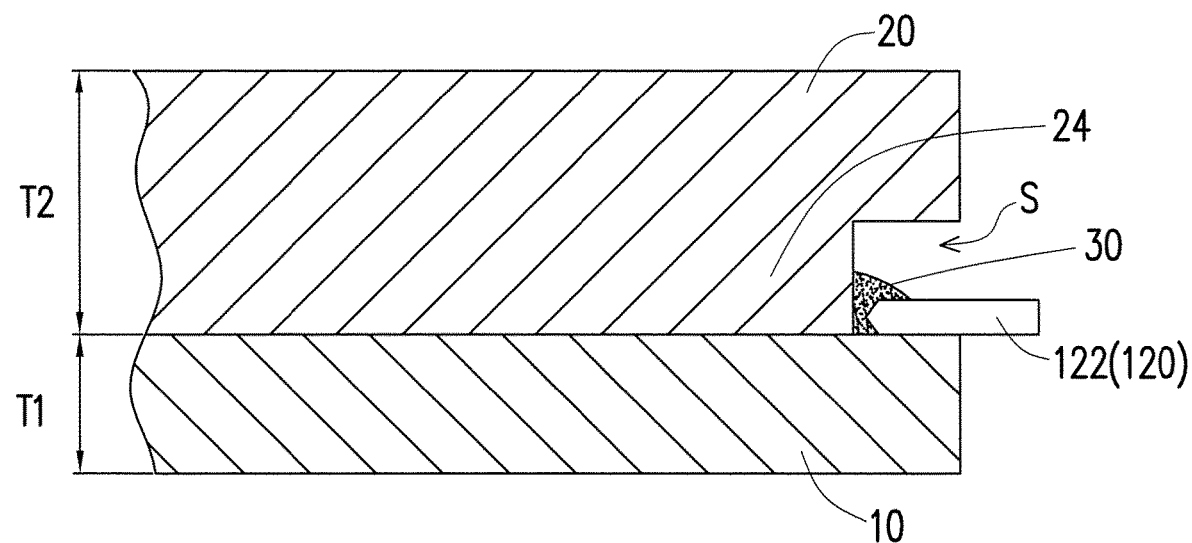
Figure 3C:
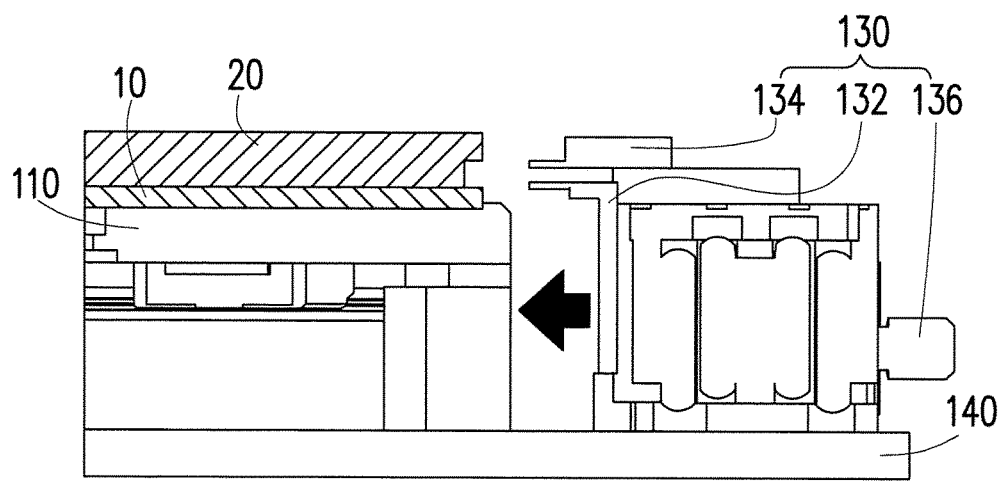
Figure 3D:
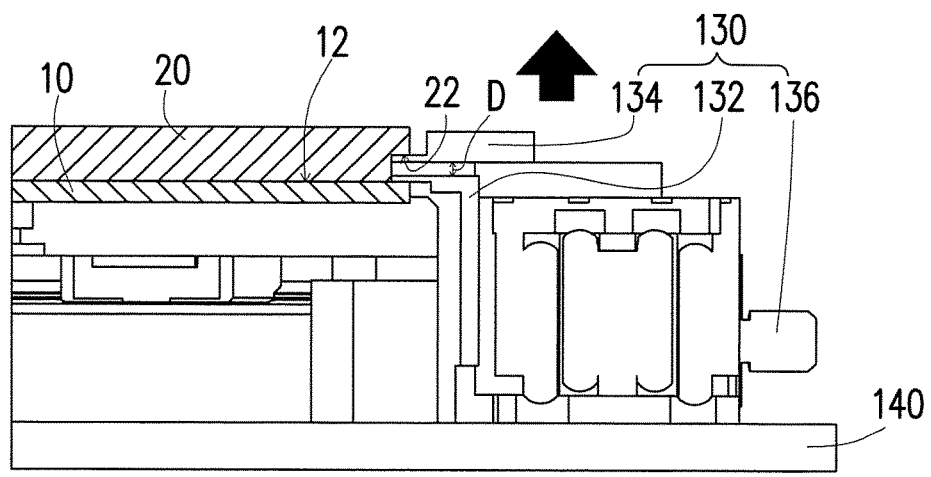
Figure 3E:
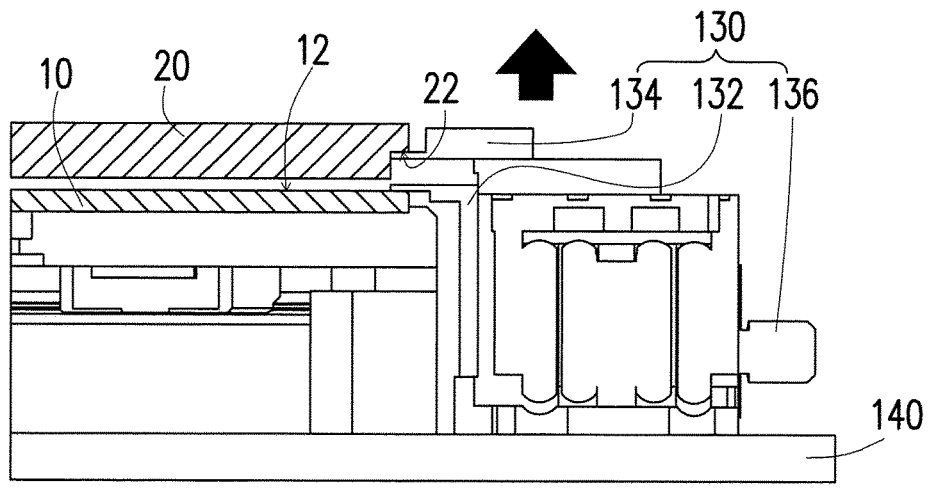

Then, referring to FIG. 2, FIG. 3A, and FIG. 3B, in step S30, the scraping mechanism 120 is caused to scrape off a spilled glue 30 produced when the first mold 10 is bonded to the second mold 20. In detail, first, the scraping mechanism 120 is moved close to the spilled glue 30 produced when the first mold 10 is bonded to the second mold 20. Then, a spin table 146 (refer to FIG. 1B) of the working platform 140 is spun to spin the carrying mechanism 110, the first mold 10, and the second mold 20 through the spin table 146 to cause the scraping mechanism 120 to scrape off the spilled glue 30 produced when the first mold 10 is bonded to the second mold 20. In other words, the scraping mechanism 120 scrapes off the spilled glue 30 surrounding entire circles of the first mold 10 and the second mold 20.

Afterwards, referring to FIG. 2 again, in step S40, after the spilled glue 30 is scraped off, the separation mechanisms 130 are caused to pull open the first mold 10 and the second mold 20 so that the first mold 10 and the second mold 20 are separated from each other. In detail, referring to FIG. 3C, first, the separation mechanisms 130 are moved close to the first mold 10 and the second mold 20 on the carrying mechanism 110. Next, referring to FIG. 3D, a first separation part 132 of each of the separation mechanisms 130 is caused to abut an upper surface 12 of the first mold 10. Then, each of pull controlling members 136 is adjusted to move each of second separation parts 134 relatively to the first separation parts 132 by a vertical distance D to abut a lower surface 22 of the second mold 20. Afterwards, referring to FIG. 3E, each of the pull controlling members 136 is constantly adjusted to constantly vertically move each of the second separation parts 134 relatively to the first separation parts 132 to pull open the first mold 10 and the second mold 20 so that the first mold 10 and the second mold 20 are separated from each other.

Lastly, after the separation mechanisms 130 are caused to pull open the first mold 10 and the second mold 20, locking members 155 are unlocked to remove the blocking plate 150, and a vacuum off button 170 is pressed to remove the vacuum adsorption force between the first mold 10 and the carrying mechanism 110. At this moment, the mold separation device 100 has separated the first mold 10 and the second mold 20.

In summary of the above, the mold separation device of the embodiments of the invention includes the scraping mechanism and the separation mechanisms. The scraping mechanism first scrapes off the spilled glue produced when the first mold is bonded to the second mold, and then the separation mechanisms pull open the first mold and the second mold so that the first mold and the second mold are separated from each other. Separating the first mold and the second mold through the mold separation device of the embodiments of the invention prevents damage to the master mold and the sub-mold and the issue of uneven glue in a subsequent glue coating process resulting from inserting the blade tool between the master mold and the sub-mold as conventionally required.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A mold separation device comprising:
   a carrying stage adapted to carry a first mold and a second mold bonded to the first mold;
   a scraping mechanism disposed at an edge of the carrying stage and comprising a blade tool adapted to scrape off a spilled glue connecting an edge of the first mold and an edge of the second mold and produced when the first mold is bonded to the second mold, wherein the blade tool is mounted in a fixed position;
   two separation mechanisms disposed at the edge of the carrying stage and located on two opposite sides of the scraping mechanism, wherein each of the separation mechanisms comprises a pull controlling member adapted to pull open the first mold and the second mold so that the first mold and the second mold are separated from each other; and
   a working platform comprising a platform surface, an accommodating recess, and a spin table, wherein a height difference exists between a bottom surface of the accommodating recess and the platform surface, and the spin table is located on the platform surface.

2. The mold separation device as recited in claim 1, wherein the carrying stage is assembled on the spin table, the spin table is spun to cause the scraping mechanism to scrape off the spilled glue produced when the first mold is bonded to the second mold, the scraping mechanism is located in the accommodating recess, and the separation mechanisms are assembled on the platform surface.

3. The mold separation device as recited in claim 1, further comprising:
   a blocking plate assembled on the platform surface, located at another edge of the carrying stage opposite to the edge, and configured to abut edges of the first mold and the second mold.

4. The mold separation device as recited in claim 1, further comprising:
   a vacuum on button disposed on the working platform and located on the platform surface, wherein a vacuum adsorption force between the first mold and the carrying stage is generated when the vacuum on button is pressed; and
   a vacuum off button disposed on the working platform and located on the platform surface, wherein the vacuum adsorption force between the first mold and the carrying stage is removed when the vacuum off button is pressed.

5. The mold separation device as recited in claim 1, wherein the scraping mechanism comprises the blade tool and an adjustment base, the blade tool is disposed on the adjustment base, and the adjustment base is suitable for adjusting a distance between the blade tool and the spilled glue, suitable for adjusting a blade angle of the blade tool, and suitable for adjusting a blade height of the blade tool.

6. The mold separation device as recited in claim 1, wherein each of the separation mechanisms comprises a first separation part and a second separation part, the first separation part and the second separation part are disposed on the pull controlling member, and the second separation part is adapted to be moved relatively to the first separation part by a vertical distance through the pull controlling member.

7. The mold separation device as recited in claim 6, wherein the first separation part of each of the separation mechanisms abuts an upper surface of the first mold, and the second separation part abuts a lower surface of the second mold, when the second separation part is constantly moved relatively to the first separation part by the vertical distance, the first mold and the second mold are pulled open so that the first mold and the second mold are separated from each other.

8. The mold separation device as recited in claim 1, wherein a thickness of the first mold is smaller than a thickness of the second mold.

9. The mold separation device as recited in claim 1, wherein the second mold comprises an indented portion indented towards the first mold to define an indented space with the first mold, and the spilled glue produced when the first mold is bonded to the second mold is located in the indented space.

* * * * *